United States Patent [19]

Feldman

[11] 4,281,981
[45] Aug. 4, 1981

[54] DIE ASSEMBLY PROVIDING UNIFORM PRESSURE AND FLOW

[75] Inventor: Daniel W. Feldman, Beachwood, Ohio

[73] Assignee: Standard Oil Company (Ohio), Cleveland, Ohio

[21] Appl. No.: 109,750

[22] Filed: Feb. 25, 1980

[51] Int. Cl.³ .......................... B29F 3/04; B29D 23/04
[52] U.S. Cl. ..................................... 425/467; 264/564; 264/209.1; 425/131.1; 425/326.1; 425/376 A; 425/462
[58] Field of Search ................... 425/462, 380, 376 R, 425/376 A, 467, 113, 326.1, 466, 461, 133.1, 131.1; 264/563, 564, 209

[56] References Cited

U.S. PATENT DOCUMENTS

| | | | |
|---|---|---|---|
| 2,943,352 | 7/1960 | Van Riper | 425/380 |
| 2,957,201 | 10/1960 | Fields et al. | 425/133.1 |
| 2,978,748 | 4/1961 | McCauley et al. | 425/380 |
| 3,303,247 | 2/1967 | Carter | 264/563 |
| 3,308,509 | 3/1967 | Hsia | 425/380 |
| 3,323,172 | 6/1967 | Pierson et al. | 425/376 A |
| 3,546,743 | 12/1970 | Roth | 425/133.1 |
| 3,895,900 | 7/1975 | Harold et al. | 425/466 |
| 4,042,661 | 8/1977 | Cook | 425/462 |
| 4,047,868 | 9/1977 | Kudo et al. | 425/462 |
| 4,167,383 | 9/1979 | Murakami et al. | 425/462 |

*Primary Examiner*—Jeffery R. Thurlow
*Attorney, Agent, or Firm*—David J. Untener; Herbert D. Knudsen; Larry W. Evans

[57] ABSTRACT

A die assembly of the present invention for extrudable materials includes a first member providing an external wall of a continuous cavity for passage of the extrudable material, a second member providing the internal wall of the cavity, a bushing for directing the flow of extrudable material within the cavity in one axial direction, a distributor interposed within the cavity, providing a restricted space therein for passage of the extrudable material, and a channel formed between the bushing and distributor through which the extrudable material flows axially and peripherally. The die assembly of the present invention can be modified for the coextrusion of two or more layers.

5 Claims, 2 Drawing Figures

DIE ASSEMBLY PROVIDING UNIFORM PRESSURE AND FLOW

TECHNICAL FIELD

The present invention relates to a film blowing process by which a suitable plastic resin is extruded into a thin-walled tube, which tube is continuously drawn from the extruder die and is subsequently expanded with air to form a bubble. Expansion and drawing of the resin in its plastic state reduces the wall thickness to that of a thin film. After solidification, i.e., beyond the frost line of the bubble, the bubble is drawn between the nip rolls, which seals the air contained therein and continuously draws more resin from the extruder.

The objective of correct design and operation of the extrusion system is to provide a uniform circular extrudate at the die lips, providing uniformity in thickness, velocity and temperature. The objective of the film blowing operation is to reduce the thickness of the film by drawing, that is, increasing the axial film velocity, and blowing which increases the bubble radius. Both drawing and blowing must be performed in a uniform axisymmetric manner. Another objective of the operation is to freeze the molten material, usually by means of a forced air flow over the film surface, before it is guided between the driven nip rolls.

BACKGROUND ART

In order to produce the blown film, the resin must first flow into an annular path. Existing annular dies have a port in one side for entrance of the resin. These dies comprise an outer cylinder or circular die, a central mandrel and a bushing blocking one end of the die and having a slanted or helical profile directing the resin upwardly toward the exit of the die while guiding the resin circumferentially around the inner surface of the die. As designed, the gap between the circular die and mandrel is uniform to insure that the thickness of the flow paths are constant. The length of the path can be short, for flow going directly axially from the entrance port, while it must be very long for flow that passes to the opposite side of the mandrel before going axially. The experience with existing dies has been that the flow is not uniform, nor will the pressure be in any plane parallel to the die exit. Pressure and flow will be highest on the side of the entry port and lowest on the opposite side.

After travelling annularly within the die, the resin is directed through a metering gap formed by a flaring of the mandrel proximal the exit of the circular die. As the plastic resin exists, the pressure of internal air admitted through the center of the mandrel forms a bubble, the diameter of which will be several times the diameter of the die orifice. Thickness of the film will be nonuniform as will be its strength if the flow and pressure of resin through the die have been nonuniform.

Although this system is in common use, one problem that has remained is the uniform flow, pressure and distribution of the plastic resin within the die prior to formation of the bubble. Inasmuch as the resin greatly prefers axial flow, immediately adjacent the side port, to the circumferential flow around the mandrel, one approach has been to provide a large annular flow path followed by a restricted axial flow path, which system can be repeated several times within the die to reduce the foregoing differences in uniformity. The resin path can also be structured spirally, further reducing pressure and flow differences.

While these means will reduce the differences, they cannot eliminate them. Further correction has been facilitated by employing a movable bushing at the die exit which can be adjusted to lessen the gap near the entry port and increase it in the area furthest therefrom. As is understandable, these means represent increases in equipment costs as well as labor where adjustments are necessitated.

Pressure and flow differences also occur where two or more concentric layers of material are to be simultaneously extruded from concentric dies. Each successive layer will be nonuniform in thickness and will displace the mating layers where its pressure is greatest and, in turn, will be displaced where the other layer or layers are at maximum pressure. It is not feasible to provide movable bushings for the inner layer or layers inasmuch as the bushing and adjustment means are totally within the surrounding layers.

Multi-layered products produced by a multiple-bubble approach are becoming more desirable for items such as garbage bags, trash liners and food wrapping materials. It is therefore highly desirable that a die system be developed that will facilitate the manufacture of such films. No existing approach for single or for multi-layered films of which I am aware provides a uniform flow and pressure of the resin without special, complex tooling of the die and accompanying bushings and then, uniformity does not always result.

DISCLOSURE OF THE INVENTION

It is therefore an object of the present invention to provide a die assembly which provides uniform pressure and flow of resin within its periphery which die assembly can be utilized in systems for producing blown films.

It is another object of the present invention to provide a die assembly as set forth hereinabove that can be utilized in systems for producing multi-extruded layered blown films, pipes and bottles.

It is yet another object of the present invention to provide a die assembly as set forth hereinabove, that has a relatively simple internal construction thereby minimizing tooling costs and eliminating labor that has been necessary to adjust and clean existing equipment having a more complex design.

These and other objects, together with the advantages thereof over known methods, which shall become apparent from the specification which follows, and accomplished by the invention as hereinafter described and claimed.

In general, a die assembly of the present invention for extrudable materials includes a first member providing an external wall of a continuous cavity for passage of the extrudable material, a second member providing the internal wall of the cavity, a bushing for directing the flow of extrudable material within the cavity in one axial direction, a distributor interposed within the cavity, providing a restricted space therein for passage of the extrudable material, and a channel formed between the bushing and distributor through which the extrudable material flows axially and peripherally.

The die assembly of the present invention can be modified for the coextrusion of two or more layers. Such an assembly for the extrusion of three layers of material into one continuous layer includes a third member providing the internal wall of a second cavity, formed with the second member, a second bushing for directing the flow of extrudable material within the second cavity in one axial direction, a second distributor interposed within the second cavity, providing a restricted space therein for passage of the extrudable material, and a second channel formed between the second bushing and second distributor through which the extrudable material flows axially and peripherally. In like fashion, the assembly further includes a fourth member providing the internal wall of a third cavity, formed with the third member, a third bushing for directing the flow of extrudable material within the third cavity in one axial direction, a third distributor, interposed within the third cavity, providing a restricted space therein for passage of the extrudable material, and a third channel formed between the third bushing and third distributor through which the extrudable material flows axially and peripherally.

PREFERRED MODE FOR CARRYING OUT THE INVENTION

The die assembly of the present invention can be utilized for the production of blown films from materials such as polyethylene, polyvinyl chloride and copolymers such as Barex. Barex is a registered trademark of Viston Corporation for barrier resins. Barex 210, an acrylonitrile-methylacrylate-rubber copolymer has particular utility as food packaging in both sheet and film forms inasmuch as it is clear, shatter resistant, offers a barrier to gasses, protects from oxidation, has no odor or taste transfer, resists food oils and solvents and provides negligible loss of aromas and flavors. It can be coextruded with other plastics such as polyethylene with a suitable adhesive therebetween with the die assembly of the present invention. As will be evident, the present invention will find utility with any of the existing resins as well as with resins that may be developed for use in extrusion processes and therefore use of the die assembly should not be limited to any particular plastic. Moreover, extrusion of various plastics through dies to form films, sheets, pipes, bottles and the like is also known and it is intended that the structure of the die assemblies set forth herein can be utilized as a substitute for existing dies in many of these systems rather than only blown film apparatus.

Figure 1:
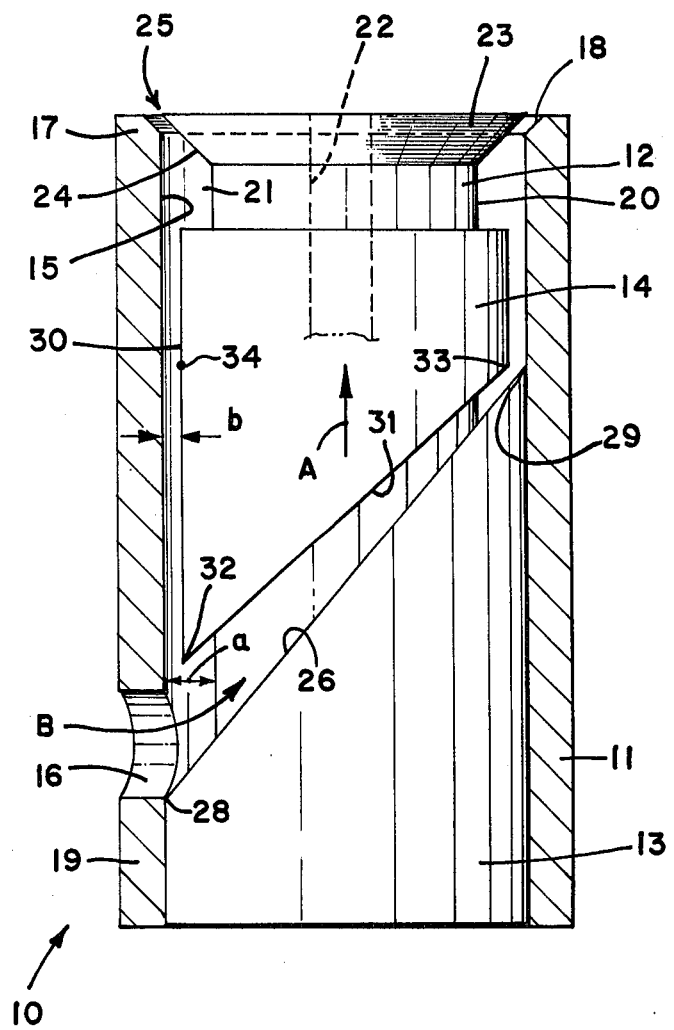
FIG. 1 is a side elevation, partially in cross-section, of the die assembly of the present invention for extruding a single layer of resin.

With respect to the drawings, the die assembly of the present invention for extrusion of a single resin is depicted in FIG. 1 and is generally indicated by the numeral 10. The assembly 10 basically comprises the die body or outer cylinder 11, the mandrel 12, a blocking bushing 13 and resin distributor 14. The assembly is designed to permit axial flow in the direction of the arrow A.

The die body 11 is hollow, having an inner wall 15 which is continuous and cylindrical. A feeding port 16 is provided near the bottom of one side of the body for entry of the plastic resin from the barrel of a conventional extruder (not shown). One end 17 of the body is open and the annular wall 15 may be slightly flared radially outwardly as at 18. The opposite end 19 is closed by the blocking bushing 13 which prevents reverse flow of the resin within the die assembly as will be discussed hereinbelow.

The mandrel 12 provides a cylindrical outer wall 20 and is concentrically mounted within the die body so as to form a continuous cavity 21 of uniform thickness, the external wall of which is die wall 15 and the internal wall of which is mandrel wall 20. In conventional die assemblies, the resin distributor 14 is not present, that is, the annular flow is unrestricted, and the thickness of the cavity and in turn the tube produced therein, would be the distance a, between the walls 15 and 20. As is also conventional, an air line 22 is provided through the center of the mandrel to expand the tube which emanates from the die and forms a bubble. The end of the mandrel proximal the opening of the die body, end 23, forms a cone 24, which, together with the flared surface 18, forms a metering gap indicated by the numeral 25. The metering gap determines the final wall thickness of the extruded tube and the diameter thereof. Thereafter, wall thickness decreases in a controlled manner depending upon the diameter to which the bubble is expanded by air and the axial film velocity.

The blocking bushing 13 presents a solid inclined surface 26 continuous with the bottom of entry port 16, as at 28, and rising within the cavity to a point 29. Inasmuch as surface 26 bisects a cylindrical cavity, its shape is elliptical. The exterior edge of surface 26 is contiguous with the inner wall 15, one-half of which is visible in FIG. 1 with the remaining half returning from point 29 to point 28. The flow of resin is urged along the inclined surface 26 both peripherally around the mandrel and axially. The slope of inclined surface 26 is positive as viewed in FIG. 1 and it can vary depending upon the design of the die assembly and the resin being extruded so long as it is sufficient to maintain a constant shear rate. The bushing 13 can be tooled so as to fit concentrically around the mandrel 12 and within the die body 11.

The resin distributor 14 is a cylindrical element which fits over the mandrel 12. Between its outer wall 30 and the inner wall 15 of the die body is a restriction, dimension b, for the resin flow in an axial direction but which allows the resin to travel freely peripherally away from the entry port 16. Alternatively, the distributor could be carried by the die wall, providing restricted axial flow between itself and the wall 20 of the mandrel. The end of distributor 14 proximal the entry port 16 is provided with an inclined elliptical surface 31, the lowest point of which is at 32 and the highest point of which is at 33. Projection of the point 33 to the opposite side of the distributor in a plane perpendicular to axial flow, is depicted by the numeral 34 which will be used with reference to certain distances hereinbelow. The slope of surface 31 is also positive although not as great as that for the surface 26 of bushing 13. As viewed in FIG. 1, the surfaces 26 and 31 are convergent and would meet at a point beyond the inner wall 15.

The purpose of the resin distributor is to interpose a controlled restriction to axial flow by reducing the original radial thickness of the flow path from dimension a to dimension b over a prescribed distance in the axial direction while leaving fully open a tapered, inclined path or channel indicated by the arrow B adjacent to the entry port to permit free peripheral flow. The radial thickness of the restricted axial path b, must bear the same ratio to a, the radial thickness of the unrestricted cavity, as the axial displacement path, from 32 to 34, bears to the inclined path to the same elevation from 32 to 34. In this manner, there will be uniform flow resistance inasmuch as the longer path is through the thicker channel.

With the flow uniformly dispersed around the periphery, the material flowing in the tapered channel B will be at a maximum at the entry port. Portions of the material will leave the channel B and flow axially, thus reducing the quantity remaining in the channel until the last increment of material leaves the channel at the point 33, i.e., on the side of the die opposite the entry port. Therefore, the height of the channel should decrease in proportion to the volume of material moving axially from a maximum at the entry port to a minimum on the opposite side of the die.

During operation, resin enters the cavity 21 some of which flows axially immediately in the vicinity of the point 32, while the remainder flows in opposite peripheral directions around the mandrel 12 in the channel B. Inasmuch as some of the resin leaves channel B to flow axially in the restriction of cavity 21, dimension b, the channel is tapered to maintain uniform flow and pressure of the moving resin remaining in the channel. At the top of the resin distributor, the full dimension of the cavity 21 is presented to even out any pressure or flow differences around the periphery that may remain. The resin is then forced through the metering gap 25 and into the air which gap provides the final restriction from the die assembly.

The design of the die assembly of the present invention is such that the dimension a, of cavity 21, can be about three times the thickness of the dimension b, the restricted axial path, which is, in turn about three times the thickness of the metering gap 25. These dimensions are, of course, relative and are not to be construed as limiting. In other embodiments where the die assembly is shorter, but of the same diameter, the slope of channel B would be less steep in which instance the thickness of dimension a could range from four to five times the thickness of dimension b. Usually, the ratio of thicknesses between dimension b to metering gap 25 is acceptable at about 2 to 4:1.

In a test with the foregoing die assembly 10, a tube was extruded and the radial thickness checked at 12 points around the circumference. Thickness ranged from 1.07 mm to 1.14 mm and, from a visual inspection of entrapped air bubbles in the resin, it could readily be seen that flow within the die assembly had been axial. In previous samples, without the use of the resin distributor, the thickness variations were greater and the flow path of the resin radiated out from the point of feed toward the opposite die wall.

Figure 2:
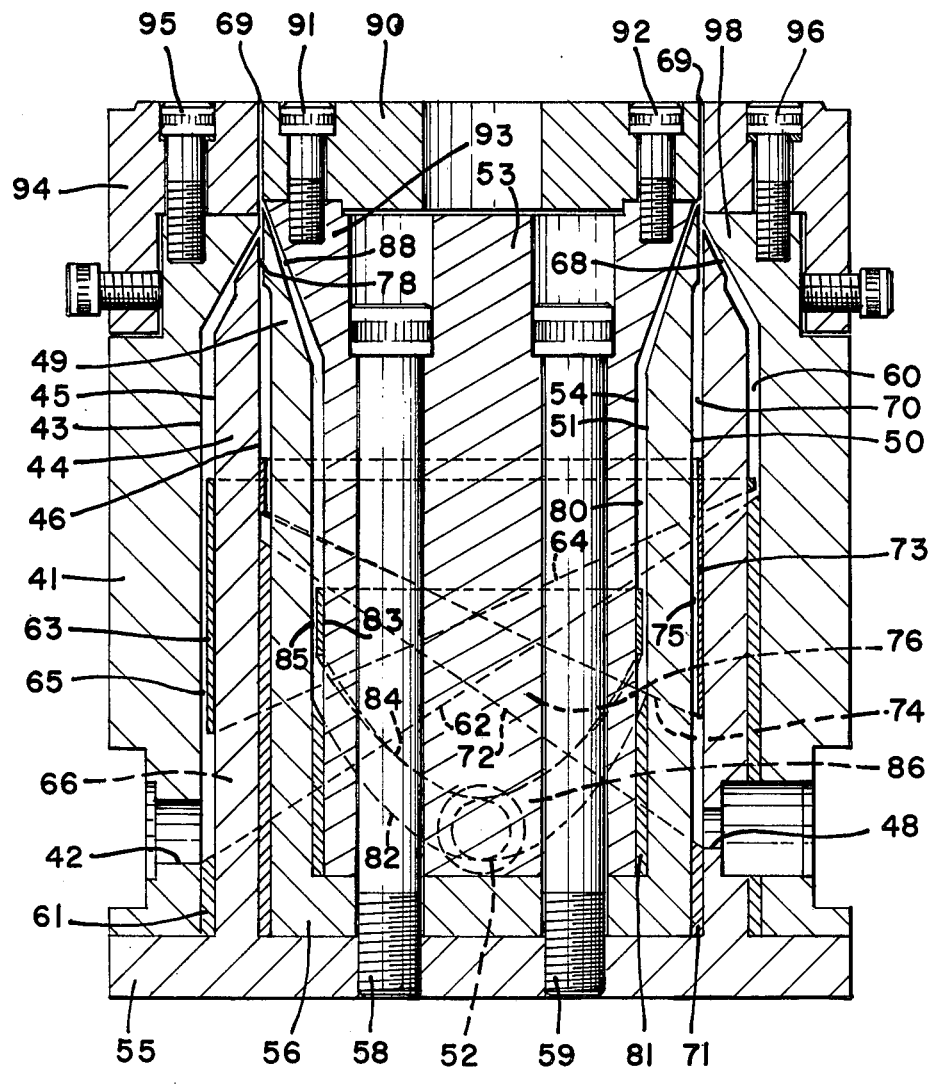
FIG. 2 is a side elevation, partially in section, of another die assembly of the present invention for extruding multiple layers of resin.

With respect to FIG. 2, a die assembly suitable for extruding three layers is generally indicated by the numeral 40. The assembly 40 could be utilized for the coextrusion of two different plastics such as Barex and polyethylene with an inner layer of a glue or adhesive. Although three layers are described herein, it is to be understood that the present invention contemplates the extrusion of two or more layers wherein none or one or more of the layers can be an adhesive while the others are plastics. Use of an adhesive will obviously depend upon the number of layers and their ability to bond together during the extrusion process in the absence of the adhesive. Similarly, materials other than plastic resins or adhesives could comprise one or more of the layers so long as the material can be extruded.

The assembly 40 is identical in principle to the asembly 10 and therefore the operation thereof shall not be described in as great a detail as hereinabove. An outer die body member 41 is provided having a side entry port 42 and inner wall 43. A second body member 44 is provided having an outer wall 45 which serves as a mandrel to the die inner wall 43. The inner wall 46 thereof forms an exterior surface for a second layer of material which is fed through a second side entry port 48, passing through outer die body 41 and second body member 44.

In like fashion, a third body member 49 is provided having an outer wall 50 which serves as a mandrel to the second body inner wall 46. The inner wall 51 thereof forms an exterior surface for a third layer of material which is fed through a third side entry port 52, passing through the outer, second and third body members 41, 44 and 49, respectively. Finally, a fourth body member or mandrel 53 is provided in the center of the three body members, carried concentrically therewith as is each member to the other. The exterior surface 54 of the mandrel 53 provides the mating surface to the wall 51 of body member 49.

Construction of the die assembly components described thus far is relatively simple. The second body member 44 carries a broad flat base 55 upon which the outer body member 41 is mounted by means not shown. Inside of the body member 44 is mounted the third body member 49 which, in turn, carries a base 56 upon which rests the mandrel 53. Bolts 58 and 59 pass through the mandrel 53 and base 56 to engage the base 55.

With respect to movement of the materials through the die assembly 40, the outermost layer, e.g., a plastic, is fed to the entry port 42 into a cavity 60 between body walls 43 and 45 to form a tube. At the lower end of the second body member 44, is a blocking bushing 61 which guides the resin axially and circumferentially upon an inclined surface 62. Above the bushing is mounted the resin distributor 63 which also provides an inclined guide 64 for the resin and restricted space or passageway 65 within the cavity 60. An inclined tapered channel 66 formed between the bushing 61 and distributor 63 provides for uniform flow and pressure of the resin to form the tube which eventually flows through a restricting channel 68 and metering gap 69.

The second layer of material, e.g., glue, is fed to the entry port 48 into a cavity 70 between body walls 46 and 50 to form a tube. At the lower end of the third body member 49 is a blocking bushing 71 which guides the glue axially and peripherally upon an inclined surface 72. Above the bushing is mounted a distributor 73 which also provides an inclined guide 74 for the glue and restricted space or passageway 75 within the cavity 70. An inclined, tapered channel 76 formed between the bushing 71 and distributor 73 provides for uniform flow and pressure of the glue to form the tube which eventually flows through a restricting channel 78, is joined by the channel 68 and flows therewith through the metering gap 69.

Upon close inspection of FIG. 2, it will be noticed that the second body member 44 has been provided with the first distributor 63 on its exterior, mandrel-like wall 45, in the first cavity, and the second distributor 73 on its interior, die-like wall 46, in the second cavity. As stated hereinabove with respect to FIG. 1, it is to be understood that the resin distributor can be carried by either the die-like member or the mandrel-like member. So long as it restricts the passageway through the cavity formed by these two members and provides a tapered, inclined passageway or channel with the blocking bushing, it can be carried within the die assembly in either fashion.

The third layer of material, e.g., plastic, is fed to the entry port 52 into a cavity 80 between body wall 51 and mandrel wall 54 to form a tube. At the lower end of the mandrel 53 is a blocking bushing 81 which guides the resin axially and peripherally upon an inclined surface 82. Above the bushing is mounted a distributor 83 which also provides an inclined guide 84 for the resin and restricted space or passageway 85 within the cavity 80. An inclined, tapered channel 86 formed between the bushing 81 and distributor 83 provides for uniform flow and pressure of the resin to form the tube which thereafter flows through a restricting channel 88 which also joins the restricting channel 78 to flow through the metering gap 69.

The metering gap 69 is formed between an inner ring 90, fastened via bolts 91, 92 to the upper cone 93 of mandrel 53, and an outer ring 94, fastened via bolts 95, 96 to the upper end 98 of the die body 41. The tube exiting from the metering gap 69, having been prepared as described herein comprises three layers. After the tube is inflated with air to form a bubble with air supplied through the mandrel as previously described, it is passed through driven nip rollers (not shown).

In a test with the foregoing die assembly, utilizing polyethylene, a glue and Barex, the polyethylene layer was first fed and as it emerged, the flow was uniform and steady, no difference in thickness could be found around the circumference. The Barex layer was then started and provided equal results. Lastly, the glue layer which was tinted red for identification purposes was started and it too gave good flow uniformity.

Next the tube was expanded to form the bubble which was fed through the nip rollers, and film production commenced. The first bubble was clear and stable and produced a film having good internal adhesion and a 5–7 mil gauge. After minor adjustments, the gauge variation was reduced to less than one mil. Approximately 45 kilograms of the film was thereafter produced and upon measuring random samples thereof by pulling apart each layer and measuring its thickness, there was less than a ten percent deviation from the average thickness in each layer.

Thus, it can be seen that the disclosed invention carries out the objects set forth hereinabove. By employing a resin distributor as described herein within a die assembly, a layer of uniform film can be readily obtained in a blown film process. Similarly, where multiple layers are required, a distributor for each layer will insure uniformity in flow and pressure of the materials within the die assembly and uniformity of thickness in the resulting multi-layered film. Owing to the relative simplicity of the assemblies set forth herein, it is evident that their manufacture will be less costly than existing systems using a series of adjustable bushings. As will be apparent to those skilled in the art, a variety of plastic products can be made in an extrusion system utilizing one of the die assemblies described herein or a modification thereof to incorporate less or more layers. Such variations can be determined without departing from the spirit of the invention herein disclosed and described. Moreover, the scope of the invention shall include all modifications and variations that fall within the scope of the attached claims.

I claim:

1. A die assembly for extrudable materials comprising:
    a first member providing an external wall of a continuous cavity for passage of said extrudable material;
    an entrance port in said first member communicating with said cavity;
    a second member providing the internal wall of said cavity;
    bushing means, for directing the flow of extrudable material within said cavity in one axial direction, said bushing means providing an inclined surface continuous with the bottom of said entrance port and rising to an elevated point on said external wall opposite said entrance port;
    distributor means, interposed within said cavity, for providing a restricted space therein for passage of said extrudable material and having an inclined surface originating at a point proximal said entrance port and terminating at a point opposite said elevated point, the length thereof being defined by the peripheral distance between said two points and the rise thereof being defined by the axial distance between said two points, wherein the ratio of the radial thickness of said restricted space to the radial thickness of said cavity is the same as the ratio of said rise to said length; and
    a channel formed between said inclined surfaces of said bushing and distributor means through which said extrudable material flows axially and peripherally.

2. A die assembly for extrudable materials, as set forth in claim 1, wherein said channel is formed between said inclined surfaces of said bushing and distributor means; said inclined surfaces extend away from said port; and wherein the distance between said inclined surfaces is greater adjacent said port than the distance therebetween at said elevated point.

3. A die assembly for extrudable materials, as set forth in claim 2, wherein said channel defines an inclined, tapered passageway, said passageway providing a connection between said cavity and said restricted space.

4. A die assembly for extrudable materials, as set forth in claim 3, wherein a metering space is provided communicating between said cavity and the outside of said die assembly for passage of said extrudable material, said metering space defining the thickness and width of said material extruded therefrom.

5. A die assembly for extrudable materials, as set forth in claim 4, wherein the radial thickness of said cavity is greater than the radial thickness of said restricted space and the radial thickness thereof is greater than the radial thickness of said metering space.

* * * * *